United States Patent
Yang et al.

(10) Patent No.: US 12,417,204 B2
(45) Date of Patent: Sep. 16, 2025

(54) SERIAL-BUS SYSTEM PROVIDED WITH DYNAMIC ADDRESS ASSIGNMENT AND ITS METHOD FOR CONTROLLING THE SAME

(71) Applicant: Prolific Technology INC., Taipei (TW)

(72) Inventors: Shun-Liang Yang, Taipei (TW); Chiun-Shiu Chen, Taipei (TW); Chih-Chin Yang, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 48 days.

(21) Appl. No.: 18/541,502

(22) Filed: Dec. 15, 2023

(65) Prior Publication Data

US 2024/0241852 A1 Jul. 18, 2024

(30) Foreign Application Priority Data

Jan. 12, 2023 (TW) .................................. 112101444

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
CPC ..................... G06F 13/4282; G06F 2213/0016
See application file for complete search history.

(56) References Cited

U.S. PATENT DOCUMENTS

| | | | | |
|---|---|---|---|---|
| 8,040,215 | B2 * | 10/2011 | Zakriti | G06F 12/0669 340/3.1 |
| 10,817,451 | B1 * | 10/2020 | Tabuchi | G06F 13/4022 |
| 11,106,620 | B1 * | 8/2021 | Mishra | G06F 1/10 |
| 11,847,079 | B2 * | 12/2023 | Teferi | G06F 13/4247 |
| 2010/0306431 | A1 * | 12/2010 | Adkins | G06F 13/4291 710/110 |
| 2014/0173013 | A1 * | 6/2014 | Liu | H04L 12/403 709/211 |
| 2018/0145935 | A1 * | 5/2018 | Blokhin | H04L 51/02 |

(Continued)

FOREIGN PATENT DOCUMENTS

| | | |
|---|---|---|
| CN | 101213535 A | 7/2008 |
| CN | 103123615 A | 5/2013 |

(Continued)

*Primary Examiner* — Henry Tsai
*Assistant Examiner* — Christopher A Daley
(74) *Attorney, Agent, or Firm* — WPAT, PC (57) ABSTRACT

A serial communication bus system with dynamic address assignment and its control method are provided in this invention. The system allows the master device to directly assign device addresses to slave devices without the need for additional signals. This assignment is determined by whether the slave device returns a confirmation (ACK) signal, enabling the next address allocation. Slave devices can also obtain unique device addresses through this allocation process. Therefore, with this invention's serial communication bus system and control method featuring dynamic address assignment, existing I²C bus signals can dynamically assign device addresses, facilitating the identification of a plurality of slave devices and preventing address conflicts among them, thereby improving communication transmission.

18 Claims, 7 Drawing Sheets

(56) References Cited

U.S. PATENT DOCUMENTS

| | | | | |
|---|---|---|---|---|
| 2018/0150424 A1* | 5/2018 | Miluzzi | ............... | G06F 13/4282 |
| 2020/0125515 A1* | 4/2020 | Jost | ....................... | G06F 13/362 |
| 2020/0409902 A1* | 12/2020 | Arnould | ............. | G06F 13/4291 |
| 2024/0160599 A1* | 5/2024 | Yang | ................... | G06F 13/4286 |

FOREIGN PATENT DOCUMENTS

| | | | |
|---|---|---|---|
| CN | 105354157 | A | 2/2016 |
| CN | 109101448 | A | 12/2018 |
| TW | I237183 | B | 8/2005 |
| TW | 201908984 | A | 3/2019 |
| TW | 202105193 | A | 2/2021 |
| TW | 202121183 | A | 6/2021 |
| TW | 202244744 | A | 11/2022 |

* cited by examiner

SERIAL-BUS SYSTEM PROVIDED WITH DYNAMIC ADDRESS ASSIGNMENT AND ITS METHOD FOR CONTROLLING THE SAME

CROSS REFERENCE TO RELATED APPLICATIONS

The present patent application claims the priority benefit of Taiwan Invention Patent Application, serial number 112101444, filed on Jan. 12, 2023. The parent application should be incorporated by reference herein.

BACKGROUND

Field of Invention

This invention pertains to a serial communication bus, particularly related to a serial communication bus system with dynamic address assignment and its control method.

Description of Related Art

The Inter-Integrated Circuit Bus ($I^2C$ Bus), a type of serial communication bus, is used in multiple master/slave architectures. It was developed by Koninklijke Philips N.V. in the 1980s for connecting peripheral devices to motherboards, embedded systems, or mobile phones. $I^2C$ can be applied to various master-slave system control architectures, including System Management Bus (SMBus), Power Management Bus (PMBus), Intelligent Platform Management Interface (IPMI), Display Data Channel (DDC), Advanced Telecom Computing Architecture (ATCA), and more.

The $I^2C$ bus uses two bidirectional open-drain lines, with one line being the Serial Data Line (SDA) for data transmission and the other being the Serial Clock Line (SCL) for initiating or stopping transmission and transmitting clock sequences. Both lines have pull-up resistors. $I^2C$ supports a wide working voltage range, from typical voltage levels of 5V and 3.3V to even lower working voltage values. Additionally, $I^2C$ uses a 7-bit address space in its reference design but reserves 16 addresses, allowing communication with up to 112 nodes in a bus. Common $I^2C$ buses have different modes based on transmission speed: Standard Mode (100 kbit/s), Low-Speed Mode (10 kbit/s), but the clock frequency can be allowed to drop to zero, which means communication can be paused. The new generation of $I^2C$ buses can communicate with more nodes (supporting a 10-bit address space) at faster rates, such as Fast Mode (400 kbit/s), Fast-Mode Plus (1 Mbit/s), High-Speed Mode (3.4 Mbit/s), and Ultra-Fast Mode (5 Mbit/s).

However, when the master device communicates data with several slave devices via the $I^2C$ bus, these slave devices must have unique device addresses. When two or more slave devices on the $I^2C$ bus have the same device address, causing address conflicts, the $I^2C$ bus system needs to add a multiplexer to expand the channels. However, adding an additional multiplexer undoubtedly increases hardware costs. In addition, Taiwan Patent No. I237183 discloses a "Method and System for Automatically Assigning Hardware Addresses" technology that aims to expand the channels by using the existing General Purpose Input/Output (GPIO) interfaces of the master device and slave devices in conjunction with control switch circuits (or transistor switches). However, while this Taiwan Patent No. I237183 can address the issue of address conflicts with the same device address, it requires the additional setup of switch circuits and, before address assignment, necessitates coordinating the on/off states of individual switch circuits. Furthermore, the number of GPIO pins of each slave device is limited (usually 3 pins), which restricts the number of slave devices that the $I^2C$ bus system can support.

SUMMARY

Therefore, one objective of the present invention is to provide a serial communication bus system with dynamic address assignment and its control method. In this system, the master device (Master) directly assigns assignable device addresses to slave devices without the need for generating additional signals. This assignment is determined directly by whether the slave device returns a confirmation (ACK) signal, allowing the next address allocation. Consequently, slave devices can obtain device addresses through this allocation process. Accordingly, the present invention, featuring a serial communication bus system with dynamic address assignment and its control method, allows for the dynamic allocation of device addresses using existing $I^2C$ bus signals, enabling the identification of a plurality of slave devices and avoiding address conflicts among them, thereby facilitating communication transmission.

To achieve the above objectives, this present invention provides a serial communication bus system with dynamic address assignment, comprising: a master device; a plurality of slave devices, each of which provides a random delay time; and a serial communication bus, serving as a connecting interface between the master device and the slave devices; wherein, when the master device assigns a simulated identification code via the serial communication bus, it acquires the simulated identification code as the device address for the corresponding slave device from among those with the longest random delay time.

Moreover, the present invention provides a control method for a serial communication bus system with dynamic address assignment, comprising: providing a master device; providing a plurality of slave devices, each of which provides a random delay time; providing a serial communication bus, serving as a connecting interface between the master device and the slave devices; and when the master device assigns a simulated identification code via the serial communication bus, acquiring the simulated identification code as the device address for the corresponding slave device from among those with the longest random delay time.

BRIEF DESCRIPTION OF THE DRAWINGS

To assist those of ordinary skill in the relevant art in making and using the subject matter hereof, reference is made to the appended drawings, in which like reference numerals refer to similar elements.

DETAILED DESCRIPTION OF PREFERRED EMBODIMENTS

Standard I²C uses two bidirectional open-drain serial signal lines, SCL/SDA, where the Serial Data Line (SDA) is for data transmission, and the Serial Clock Line (SCL) is for starting or stopping transmission and sending timing. At the master device end, communication with I²C slave devices is done using fixed device addresses. When two slave devices with the same address are connected simultaneously, address conflicts occur. The present invention provides a serial communication bus system with dynamic address assignment and its control method. In this system, the master device (Master) directly provides assignable simulated identification codes (referred to as SIDs) to slave devices as device addresses without the need for generating additional signals. The determination of successful allocation is made directly by whether the slave device returns a confirmation (ACK) signal, thus allowing the allocation of device addresses to each slave device. With this invention, using existing I²C bus signals for dynamic address assignment, a plurality of slave devices can be identified, avoiding address conflicts among them, and improving communication transmission.

Figure 1:
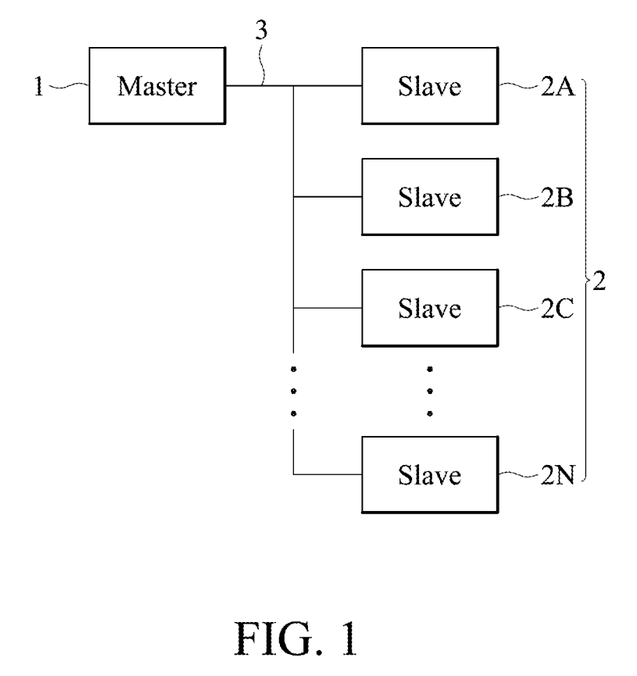
FIG. 1 depicts a block diagram illustrating a serial communication bus system according to the present invention.

Please refer to FIG. 1, which is a schematic block diagram illustrating a serial communication bus system with dynamic address assignment according to the present invention. In this example, the I²C bus system is used, but the invention is not limited to it. In this example, the I²C bus system includes an I²C master device 1, several I²C slave devices 2 (FIG. 1 shows a plurality of slave devices 2A, 2B, 2C, . . . , 2N, etc., and the following explanation will use the label 2 to represent all or part of the a plurality of slave devices), and an I²C bus 3 connecting them. The bus 3 mainly consists of two bidirectional open-drain serial signal lines, SCL and SDA, where SDA is for data transmission, and SCL is for starting or stopping transmission and sending timing.

According to the present invention, the I²C master device 1 sequentially provides assignable SIDs to I²C slave devices 2. After each byte of SID is sent, a random delay is generated behind the confirmation signal ACK. Then, the SCL level is checked. This allows the I²C master device 1 to directly know the assigned SIDs and their quantity, and the I²C slave devices 2 can also obtain SIDs directly. Specifically, when SCL returns to a high level, it means that a certain slave device 2 has responded with the corresponding confirmation signal ACK, and the master device 1 determines that the SID has been successfully allocated. From the perspective of the slave device 2, once it replies with the confirmation signal ACK, SCL returns to a high level, indicating that the last slave device 2 that replied with the confirmation signal ACK has obtained the SID. With this invention, no modifications are needed in the hardware connections between the master device 1 and the slave devices 2, and no additional signals beyond the I²C standard protocol are required on the I²C bus 3 to serve as the basis for control judgments, thus solving the problem of duplicate I²C slave device addresses.

Figure 2:
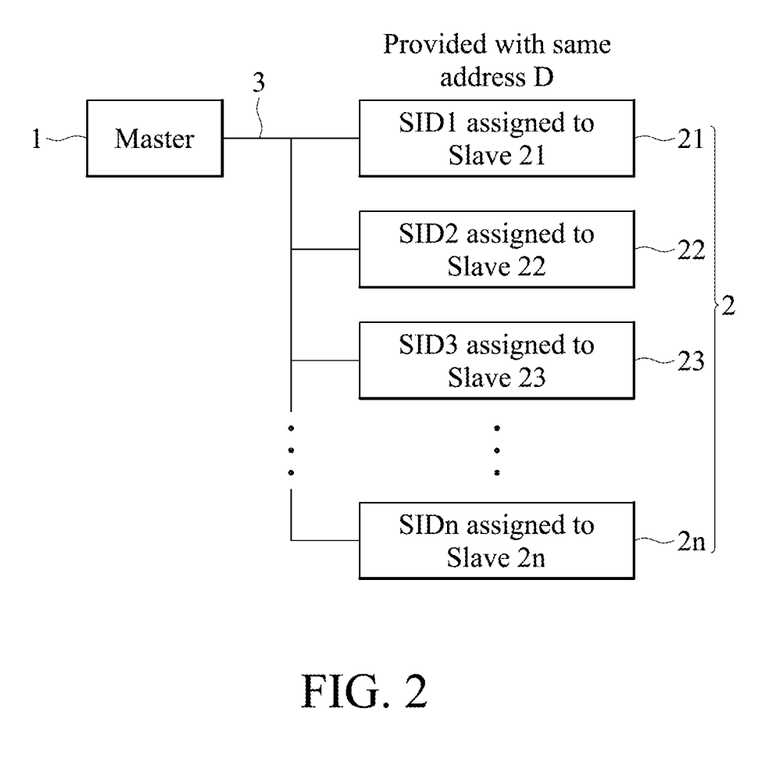
FIG. 2 presents a block diagram showing the hardware architecture of a preferred embodiment of the serial communication bus system with dynamic address assignment according to the present invention.

Please refer to FIG. 2, which is a block diagram illustrating a hardware architecture of a preferred embodiment of the serial communication bus system with dynamic address assignment according to the present invention. As shown in FIG. 2, even when multiple devices with the same device address D are connected simultaneously, the present invention can independently communicate with individual slave devices 2 by allocating SIDs. For example, if slave devices 21, 22, 23, . . . , and 2n all have the same device address D connected to bus 3, the main control device 1 assigns SIDs SID1, SID2, SID3, . . . , and SIDn to slave devices 21, 22, 23, . . . , and 2n, respectively. The allocation success is determined by whether the corresponding confirmation signal ACK is received by the main control device 1 after sending the SID. If a confirmation signal ACK is received, it indicates that the SID has been successfully assigned.

Figure 3:
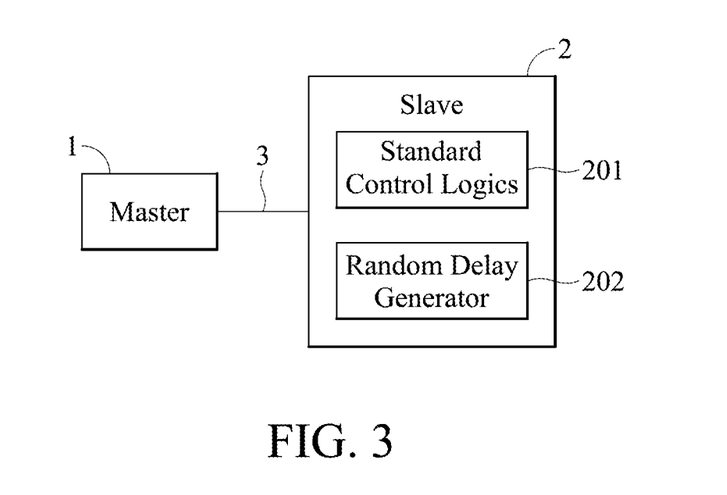
FIG. 3 displays a block diagram representing a preferred embodiment of a single slave device in FIG. 2.

Please refer to FIG. 3, which is a block diagram illustrating a preferred embodiment of a single slave device 2 in FIG. 2. In FIG. 3, each individual slave device 2 includes standard control logic 201 and a random delay generator 202. Since this example is based on the I²C bus system, the standard control logic 201 represents logic circuits that comply with the specifications of the I²C communication standard protocol. The random delay generator 202 is one of the important features of the present invention, and its function is to generate a required delay time in a random manner. In particular, the standard control logic 201 is typically implemented as hardware circuits controlled by firmware, while the random delay generator 202 can be implemented in hardware or firmware. FIG. 3 separates the standard control logic 201 and the random logic generator 202 into two blocks to highlight the feature of the present invention. In terms of system operation, these two blocks need to work together, but they can also be integrated into a single block, as those skilled in the art would understand. This representation is not meant to limit the scope of the patent application. Generally, after receiving data, the slave device 2, in this example, the random delay generator 202, generates a delay time in a random manner. After this delay time has elapsed, it informs the standard control logic 201 that the data has been received. During the delay time, an extension of the ACK signal can be observed on the I²C bus 3.

Figure 4:
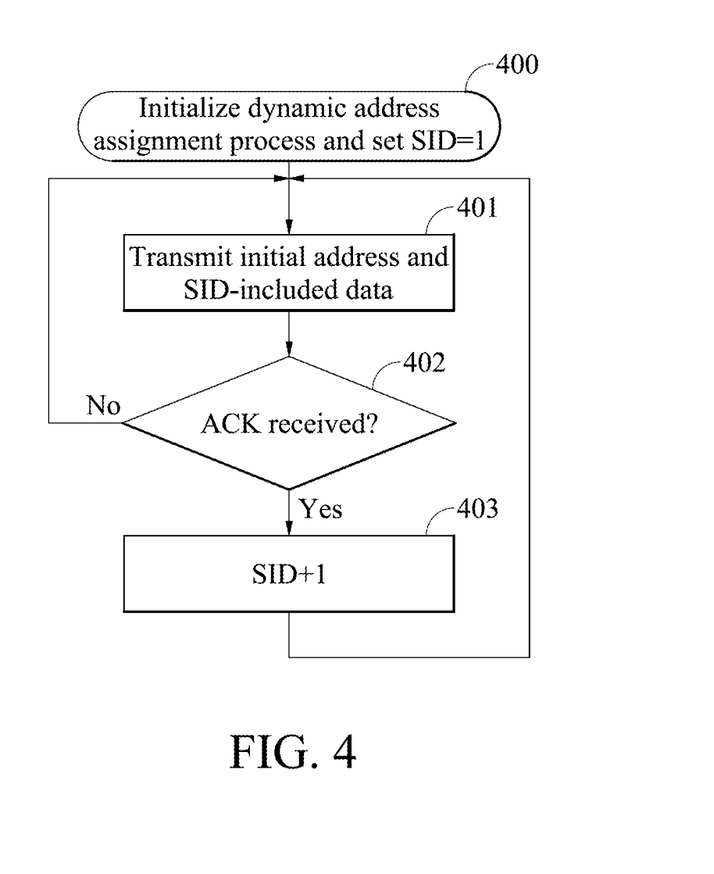
FIG. 4 illustrates a control flowchart at the master device end according to the present invention.

Please refer to FIG. 4, which is a control flowchart of the main control device 1 according to the present invention. First, in step 400, the dynamic address assignment process begins by setting the SID to 1. Then, in step 401, the I²C master device 1 sends a command to the slave device 2 with a predetermined initial address, along with an assignable SID. The predetermined initial address can be pre-agreed upon and can be any of the 128 possible addresses, typically including the General Call address specified by the I²C bus standard protocol. Next, in step 402, the main control device 1 determines whether it has received the corresponding confirmation signal ACK after sending the command. If no ACK is received after a certain period of time, the same SID is reused, and the process returns to step 401 for the re-allocation of device addresses to slave device 2. On the other hand, if an ACK is received, it indicates that the current SID has been successfully allocated. Step 403 is then executed to increment the SID by 1, and the process returns to step 401, allocating the next SID (i.e., SID+1) to the slave device 2 for device address allocation.

Figure 5A:
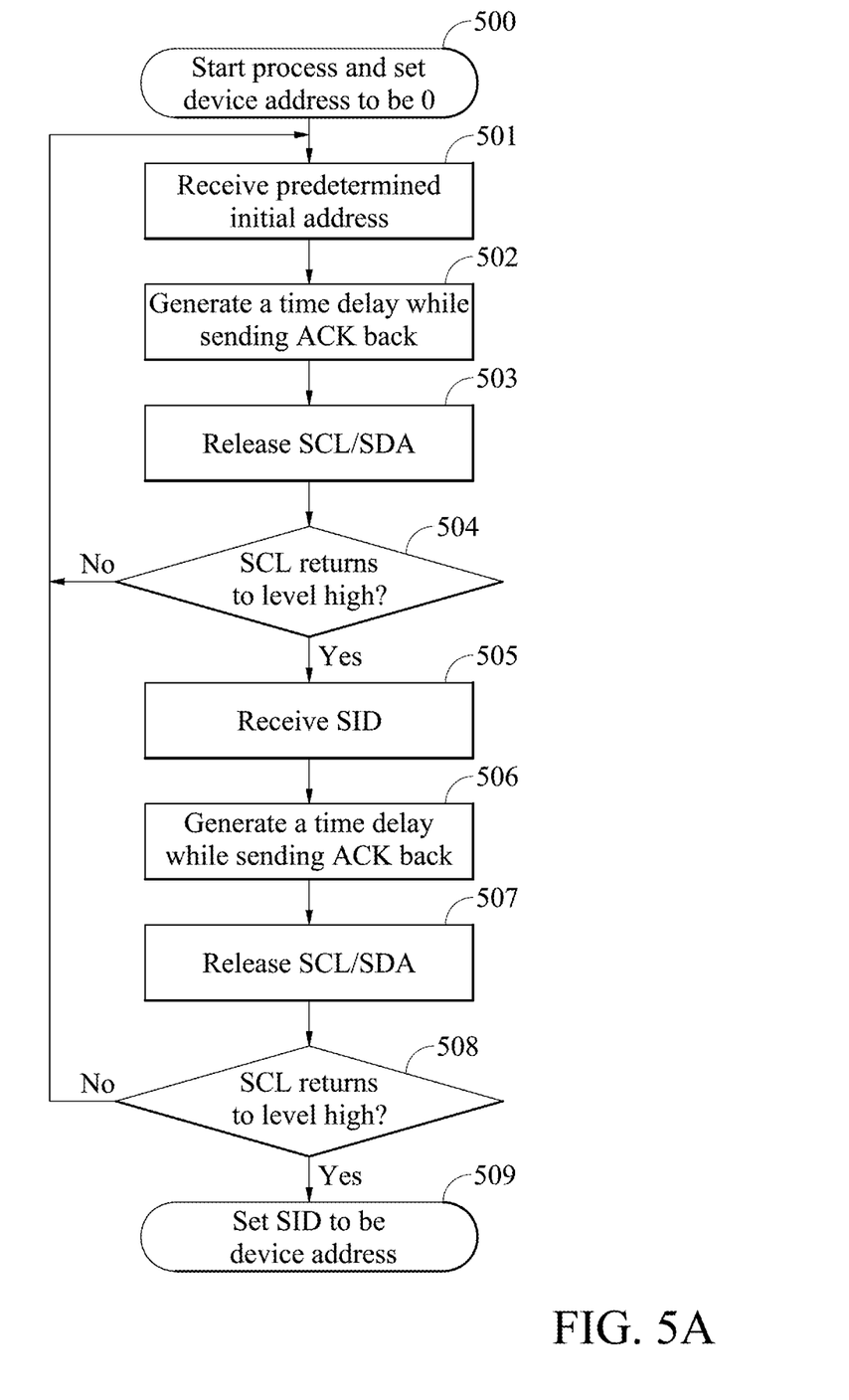
FIGS. 5A and 5B display control flowcharts for slave devices according to the present invention.
Figure 5B:
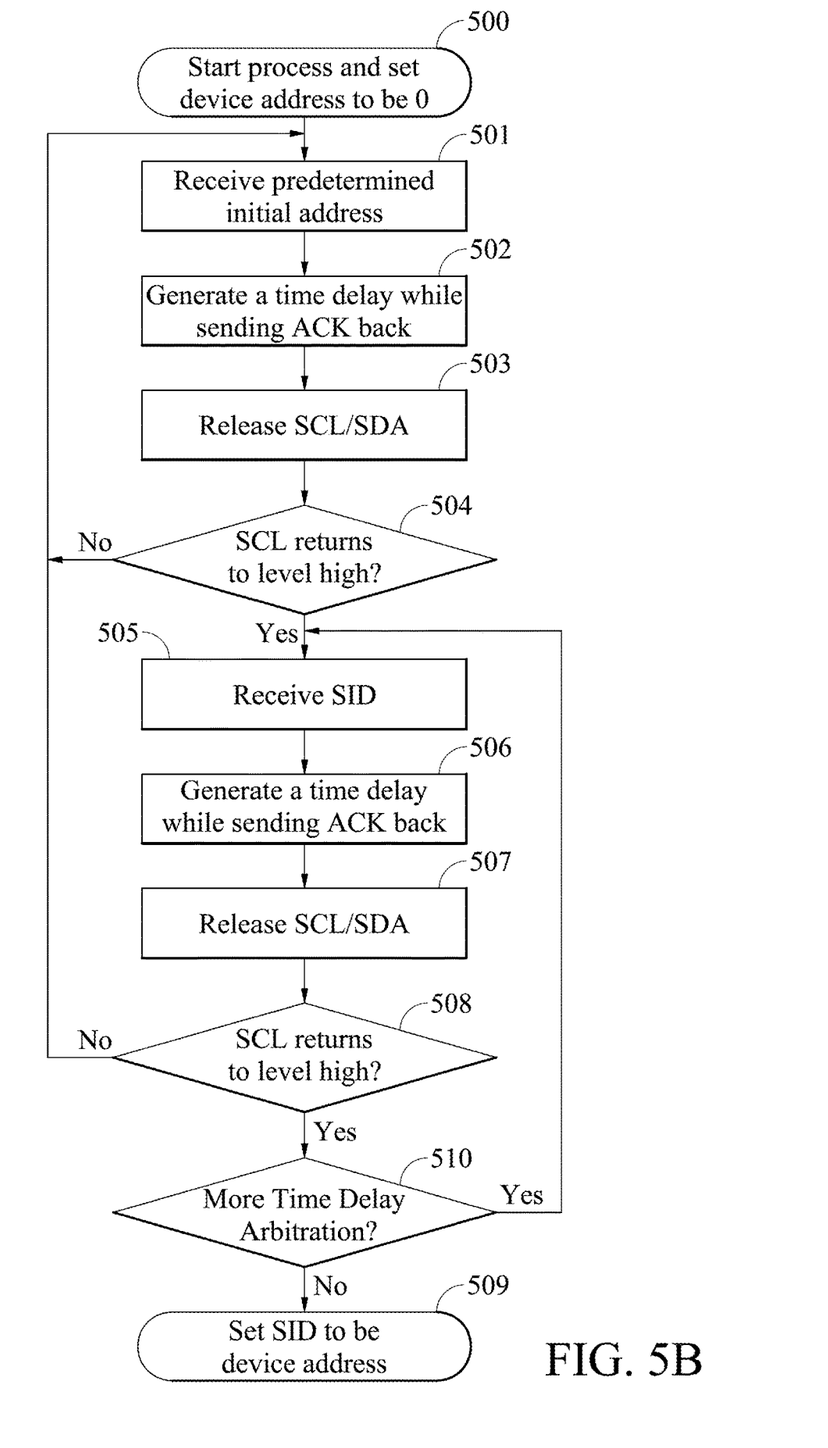

Please refer to FIGS. 5A and 5B, which illustrate the control flowcharts for the slave device 2 according to the present invention. As shown in FIG. 5A, the dynamic address assignment process begins in step 500. For each individual slave device 2, all device addresses are initially set to 0, and a predetermined initial address, pre-agreed upon with the main control device 1, is prepared to receive the SID. As mentioned above, this initial address is typically a General Call address specified by the I²C bus standard protocol.

Then, in step 501, the slave device 2 waits for the main control device 1 to send the predetermined initial address. When the slave device 2 detects the predetermined initial address sent by the main control device 1, it means that it is ready to receive the SID in the subsequent steps (as described in step 505). Next, in step 502, after receiving the predetermined initial address transmitted by the main control device 1, the slave device 2 responds with the confirmation signal ACK and simultaneously generates a delay time using its internally set random delay generator 202 before releasing the SCL/SDA bus in step 503. In other words, this delay time is used by the slave device 2 to delay the release of the SCL/SDA signal lines.

Next, proceed to step 504, where the slave device 2 determines whether the SCL signal line has returned to a high logic level? If not, it returns to step 501, waiting for the next round of SID allocation. However, if the SCL signal line is determined to be at a high logic level, it proceeds to step 505 to receive the SID immediately following the predetermined initial address. Then, in step 506, when the slave device 2 has received the SID transmitted by the main control device 1 via the predetermined initial address, the slave device 2 responds with the confirmation signal ACK. Simultaneously, it generates a delay time using its internally set random delay generator 202 before releasing the SCL/SDA bus in step 507. In other words, this delay time is used by the slave device 2 to delay the release of the SCL/SDA signal lines. Following that, in step 508, the slave device 2 determines whether the SCL signal line has returned to a high logic level? If not, it returns to step 501, waiting for the next round of SID allocation. If the SCL signal line is determined to be at a high logic level, it proceeds to step 509 to set the SID as the device address for the slave device 2.

To prevent the possibility of different slave device 2 instances generating the same random delay time or the same line delay time, resulting in two or more slave device 2 instances acquiring the SID simultaneously, a decision step 510 is enhanced after the SCL signal line returns to high level in step 508, as shown in FIG. 5B. In this enhanced step 510, the main control device 1 decides whether to add one or more time delay arbitration. This step 510 is introduced to avoid the potential scenario where two slave device 2 instances might produce the same delay time from their respective random delay generators 202 and/or same line delay through transmission, leading to the possibility of two or more slave device 2 instances obtaining the same SID. Therefore, step 510 is introduced to prevent situations where two devices have the longest delay time being the same. If step 510 determines that this is the case, steps 505 to 508 are repeated. If not, step 509 is executed to set the SID as the device address for the slave device 2 at that time. As an example of one-byte random code, probability for generating the same delay time for two devices is around 0.39%, that is, $(1/2^8) \times 100\%$. The addition of step 510 would decrease the time delay conflict to around 0.0015%.

Figure 6A:
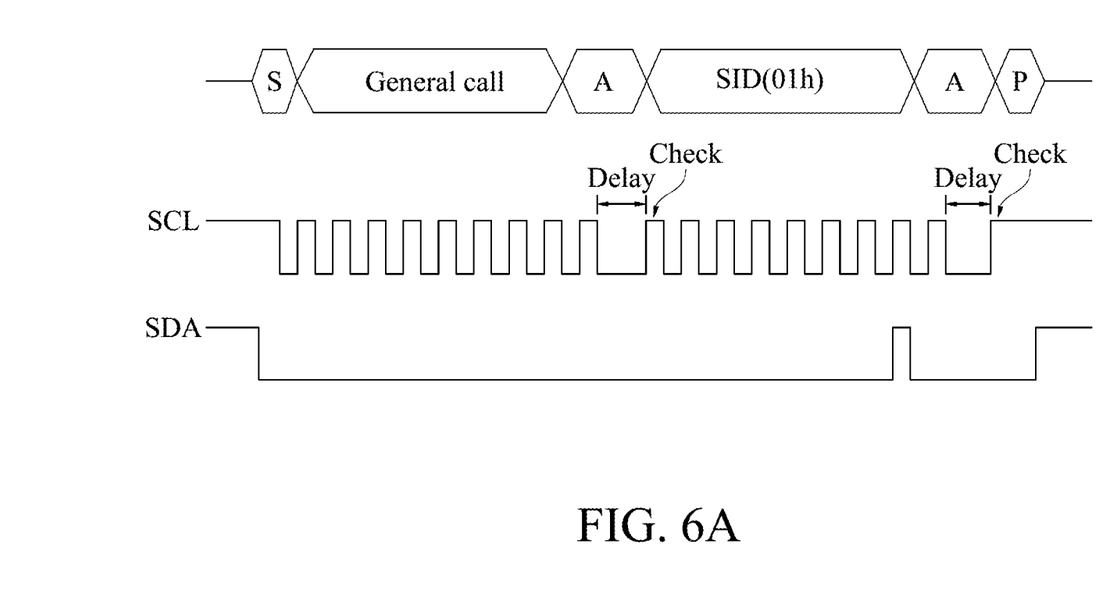
FIGS. 6A and 6B depict control timing diagrams at the slave device end according to the present invention.
Figure 6B:
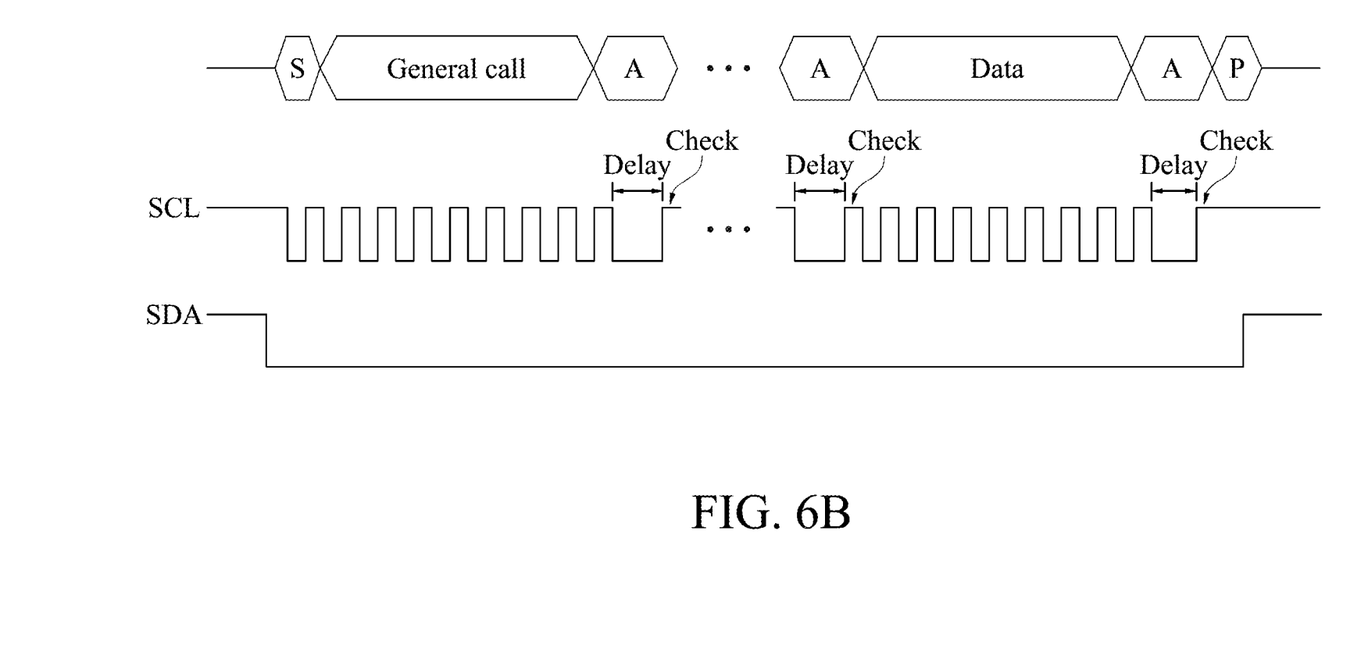

FIGS. 6A and 6B depict the control timing diagrams at the slave device end according to the present invention, with FIG. 6A corresponding to the control timing diagram in FIG. 5A, and FIG. 6B corresponding to the flowchart in FIG. 5B. As shown in FIG. 6B, the open-drain characteristics of the $I^2C$ bus protocol are utilized. During the data transmission phase, after delaying the confirmation signal ACK, the SCL/SDA signal lines are checked for the logic level. Since all slave device 2 units share the SCL signal, when a slave device 2 with a longer delay time releases the SCL/SDA signal lines, it will pull the SCL signal line to a low level. Consequently, the slave device 2 with the longest delay time will only release the SCL/SDA signal lines last, at which point the SCL signal line returns to a high level, granting usage rights to the slave device 2 with the longest delay time for acquiring the SID.

However, when multiple slave device 2 units are connected, it is possible for them to generate the same random delay time or experience line delays. In such cases, two or more slave device 2 units might obtain the SID simultaneously. To address this, as shown in the flowchart in FIG. 5B, step 510 is introduced, which checks whether two or more data entries are the same, as illustrated in the control timing diagram in FIG. 6B. This reduces conflicts among the slave device 2 units.

Therefore, the serial communication bus system with dynamic address assignment and its control method disclosed in the present invention use the main control device 1 to sequentially provide assignable SIDs to the slave device 2 units. Each slave device 2 unit generates a random delay after the acknowledgment signal ACK following each byte and then checks the logic level of SCL to confirm SID acquisition. Based on this, the main control device 1 can determine whether SID has been assigned and keep track of the quantity directly through the acknowledgment signal ACK, while the slave device 2 can also directly obtain the SID. According to the present invention, there is no need to modify any hardware connections between the main control device 1 and slave device 2. Additionally, there is no requirement to add extra signals on the bus 3 as a basis for control and judgment, thereby avoiding issues with duplicate device addresses for the slave device 2.

It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A serial communication bus system with dynamic address assignment, comprising:
   a master device;
   a plurality of slave devices, each of which has a random delay generator to provide a random delay time; and
   a serial communication bus, serving as a connecting interface between the master device and the slave devices;
   wherein, when the master device assigns a simulated identification code via the serial communication bus, it acquires the simulated identification code as the device address for the corresponding slave device from among those with the longest random delay time.

2. The serial communication bus system with dynamic address assignment according to claim 1, wherein the master device causes the slave devices to receive the simulated identification code with a predetermined initial address.

3. The serial communication bus system with dynamic address assignment according to claim 2, wherein if the serial communication bus is an I²C bus, the predetermined initial address is the General Call address.

4. The serial communication bus system with dynamic address assignment according to claim 2, wherein if any one of the slave devices receives the predetermined initial address, it sends back an acknowledgment signal.

5. The serial communication bus system with dynamic address assignment according to claim 3, wherein the I²C bus has a serial clock line (SCL), and when the corresponding slave device with the longest random delay time releases the SCL line after the longest random delay time has passed, the SCL line returns to a high logic level.

6. The serial communication bus system with dynamic address assignment according to claim 3, wherein the corresponding slave device with the longest random delay time sends another acknowledgment signal after receiving the simulated identification code.

7. The serial communication bus system with dynamic address assignment according to claim 1, wherein each of the slave devices has standard control logic.

8. The serial communication bus system with dynamic address assignment according to claim 7, wherein the random delay generator is implemented in firmware.

9. The serial communication bus system with dynamic address assignment according to claim 1, wherein when two of the slave devices have the same random delay time, the determination of the one with the longest random delay time is reconsidered, and the simulated identification code is acquired as the device address for the corresponding slave device with the longest random delay time.

10. A control method for a serial communication bus system with dynamic address assignment, comprising:
providing a master device;
providing a plurality of slave devices, each of which has a random delay generator to provide a random delay time;
providing a serial communication bus, serving as a connecting interface between the master device and the slave devices; and
when the master device assigns a simulated identification code via the serial communication bus, acquiring the simulated identification code as the device address for the corresponding slave device from among those with the longest random delay time.

11. The control method for a serial communication bus system with dynamic address assignment according to claim 10, wherein the master device causes the slave devices to receive the simulated identification code with a predetermined initial address.

12. The control method for a serial communication bus system with dynamic address assignment according to claim 11, wherein if the serial communication bus is an I²C bus, the predetermined initial address is the General Call address.

13. The control method for a serial communication bus system with dynamic address assignment according to claim 11, wherein if any one of the slave devices receives the predetermined initial address, it sends back an acknowledgment signal.

14. The control method for a serial communication bus system with dynamic address assignment according to claim 12, wherein the I²C bus has a serial clock line (SCL), and when the corresponding slave device with the longest random delay time releases the SCL line after the longest random delay time has passed, the SCL line returns to a high logic level.

15. The control method for a serial communication bus system with dynamic address assignment according to claim 12, wherein the corresponding slave device with the longest random delay time sends another acknowledgment signal after receiving the simulated identification code.

16. The control method for a serial communication bus system with dynamic address assignment according to claim 10, wherein each of the slave devices has standard control logic.

17. The control method for a serial communication bus system with dynamic address assignment according to claim 16, wherein the random delay generator is implemented in firmware.

18. The control method for a serial communication bus system with dynamic address assignment according to claim 10, wherein when two of the slave devices have the same random delay time, the determination of the one with the longest random delay time is reconsidered, and the simulated identification code is acquired as the device address for the corresponding slave device with the longest random delay time.

* * * * *